United States Patent
Torres et al.

(10) Patent No.: US 12,521,917 B2
(45) Date of Patent: Jan. 13, 2026

(54) POLYMERIZING GRAFTED NANOPARTICLES USING FLOW CHEMISTRY

(71) Applicant: Honeywell Federal Manufacturing & Technologies, LLC, Kansas City, MO (US)

(72) Inventors: Sabrina Marie Wells Torres, Lee's Summit, MO (US); Laura Christine Cummings, Kansas City, MO (US); Connor Daniel Pearson, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 710 days.

(21) Appl. No.: 17/887,579

(22) Filed: Aug. 15, 2022

(65) Prior Publication Data

US 2023/0073211 A1    Mar. 9, 2023

Related U.S. Application Data

(60) Provisional application No. 63/234,142, filed on Aug. 17, 2021.

(51) Int. Cl.
| | | |
|---|---|---|
| *B29C 41/02* | (2006.01) | |
| *B33Y 70/10* | (2020.01) | |
| *B82Y 30/00* | (2011.01) | |
| *B82Y 40/00* | (2011.01) | |
| *C08F 292/00* | (2006.01) | |

(52) U.S. Cl.
CPC ............... *B29C 41/02* (2013.01); *B33Y 70/10* (2020.01); *B82Y 30/00* (2013.01); *B82Y 40/00* (2013.01); *C08F 292/00* (2013.01)

(58) Field of Classification Search
CPC .......... B82Y 30/00; B82Y 40/00; B33Y 70/10
See application file for complete search history.

(56) References Cited

FOREIGN PATENT DOCUMENTS

WO    WO-2019060989 A1 *   4/2019    ............ C08F 292/00

OTHER PUBLICATIONS

Ramirez, Rachel Irene, "An Investigation into the Structural Design of Polymer Thin Films: From Stimuli Responsive Polyampholyte Brushes to Polymer-Grafted Nanocomposites," PhD diss., University of Tennessee, 2018, https://trace.tennessee.edu/utk_graddiss/5020, 203 pages.

Iwasaki et al., "Free Radical Polymerization in Microreactors. Significant Improvement in Molecular Weight Distribution Control," Macromolecules 2005, 38, 1159-1163, 5 pages.

Chinthamanipeta et al., "Synthesis of poly(methyl methacrylate)-silica nanocomposites using methacrylate-functionalized silica nanoparticles and RAFT polymerization," Polymer 49 (2008) 5636-5642, 7 pages.

Benoit et al., "Measuring the Grafting Density of Nanoparticles in Solution by Analytical Ultracentrifugation and Total Organic Carbon Analysis," Anal Chem, Nov. 6, 2012: 84(21): 9238-9245, doi: 10.1021/ac301980a, 18 pages.

Cummings et al., "Synthesis of Polymer Grafted Nanoparticles Via Flow Chemistry," ACS Fall 2020 Virtual Meeting & Expo, 2020, 1 page.

* cited by examiner

*Primary Examiner* — Christopher M Rodd
(74) *Attorney, Agent, or Firm* — HOVEY WILLIAMS LLP

(57) ABSTRACT

A process for forming polymer-grafted nanoparticles is provided. The process utilizes flow chemistry techniques to activate nanoparticle surfaces and then form polymer chains on the activated surfaces in a continuous process, thus avoiding the limitations and shortcomings of batch processes for forming polymer-grafted nanoparticles. The polymer-grafted nanoparticles are particularly useful as a filler or additive in fused deposition modeling ("FDM") filaments, leading to printed parts having improved properties.

19 Claims, 5 Drawing Sheets

POLYMERIZING GRAFTED NANOPARTICLES USING FLOW CHEMISTRY

RELATED APPLICATIONS

The present application claims the priority benefit of U.S. Provisional Patent Application Ser. No. 63/234,142, filed Aug. 17, 2021, entitled POLYMERIZING GRAFTED NANOPARTICLES USING FLOW CHEMISTRY, the entirety of which is incorporated by reference herein.

STATEMENT REGARDING FEDERALLY SPONSORED RESEARCH OR DEVELOPMENT

This invention was made with Government support under Contract No. DE-NA-0002839, awarded by the United States Department of Energy/National Nuclear Security Administration. The Government has certain rights in the invention.

FIELD

The present disclosure broadly relates to methods of forming polymer-grafted nanoparticles using flow chemistry.

DESCRIPTION OF RELATED ART

Polymer-grafted nanoparticles as additives in fused deposition modeling ("FDM") filaments have been shown to increase mechanical properties and interfacial adhesion in printed parts. Batch processes have been utilized to activate the nanoparticle surfaces and then to graft polymer chains to those surfaces in separate, cumbersome batch steps. However, these batch processes are time-consuming, are limited in scale, and pose safety concerns when working at larger scales. There is a need for a new process to form these polymer-grafted nanoparticles that avoids the issues associated with batch processes.

SUMMARY

In one embodiment, the present disclosure is broadly concerned with a continuous flow process for producing activated nanoparticles. The process comprises passing a quantity of starting nanoparticles and a coupling agent through a first microchannel having a first microchannel length. The coupling agent bonds with the starting nanoparticles to form the activated nanoparticles within the first microchannel length. The activated nanoparticles and a quantity of monomer are passed through a second microchannel having a second microchannel length. The monomer polymerizes within the second microchannel length to form polymer-grafted nanoparticles, with the polymer-grafted nanoparticles comprising polymeric chains bonded to the coupling agent.

In another embodiment, the disclosure provides a continuous flow process for modifying nanoparticles. The process comprises passing a quantity of starting nanoparticles and a coupling agent through a first microchannel having a first microchannel length. The coupling agent comprises an alkoxy and a reactive group chosen from vinyls, epoxies, aminos, acrylics, and mixtures thereof. The coupling agent bonds with the starting nanoparticles to form activated nanoparticles within the first microchannel length. Within about 10 seconds after the activated nanoparticles are formed, activated nanoparticles, a quantity of monomer, and an initiator are passed through a second microchannel having a second microchannel length. The monomer polymerizes within the second microchannel length to form polymer-grafted nanoparticles at a rate of about 0.05 g polymer-grafted nanoparticles/hour or greater. The polymer-grafted nanoparticles comprise polymeric chains bonded to the coupling agent.

DETAILED DESCRIPTION

Nanoparticle Activation

1. Equipment

Figure 1:
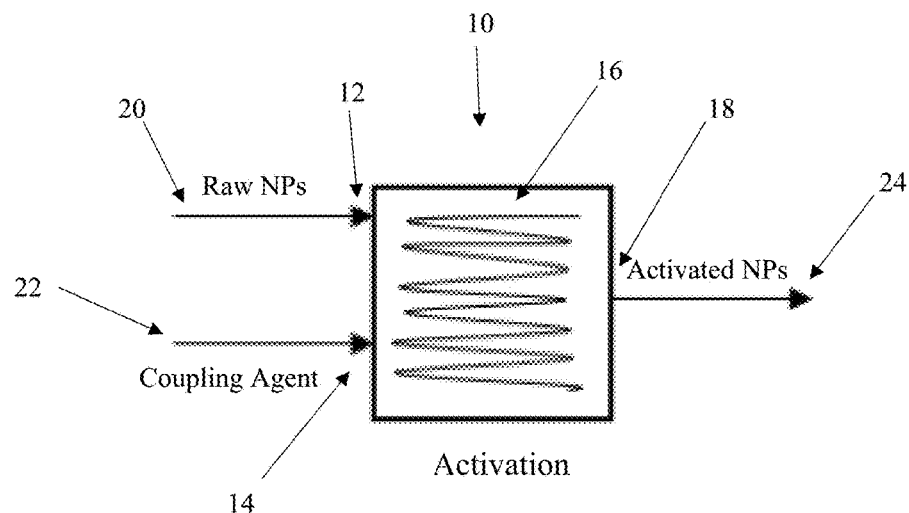
FIG. 1 is a schematic drawing (not to scale) illustrating a microreactor scheme for activating nanoparticle surfaces according to one embodiment.

Referring to FIG. 1, a nanoparticle activation microreactor 10 is schematically represented. Nanoparticle activation microreactor 10 comprises a first fluid input 12, a second fluid input 14, a microchannel 16, and a fluid output 18. First tubing 20 is operably connected to first fluid input 12, while second tubing 22 is also operably connected to second fluid input 14. Each of first tubing 20 and second tubing 22 is operably connected to respective injection syringes (not shown). Nanoparticle activation microreactor 10 is also equipped with one or more mixing junctions (not shown) between fluid inputs 12, 14 and microchannel 16. The mixing junction can be, for example, a T-mixing junction or a double T mixing junction. Microchannel 16 has a micron-sized internal diameter and preferably comprises a mixing microchannel section nearer the fluid inputs 12, 14 and a reaction microchannel section after the mixing microchannel section. Fluid output 18 is operably coupled to output tubing 24.

Nanoparticle activation microreactor 10 is preferably a glass microreactor chip, with that glass being etched with the desired design/pattern, channel depths, channel widths, channel cross-sectional shape (e.g., circular, semi-circular, oblong, semi-oblong), microreactor volume, etc. Table A provides some of these values. One suitable nanoparticle activation microreactor chip 10 is sold under the name Asia by Syrris, Ltd. (UK).

TABLE A

| | | | | |
|---|---|---|---|---|
| Microreactor Volume | about 50 μl to about 1,000 μl | about 60 μl to about 750 μl | about 60 μl to about 250 μl | about 62.5 μl |
| Mixing Microchannel Depth | about 25 μm to about 350 μm | about 45 μm to about 300 μm | about 65 μm to about 200 μm | about 85 μm |
| Mixing Microchannel Width | about 100 μm to about 400 μm | about 150 μm to about 350 μm | about 175 μm to about 250 μm | about 220 μm |
| Mixing Microchannel Length | about 450 mm to about 600 mm | about 475 mm to about 575 mm | about 500 mm to about 550 mm | about 532 mm |
| Reaction Microchannel Depth | about 25 μm to about 350 μm | about 45 μm to about 300 μm | about 65 μm to about 200 μm | about 85 μm |
| Reaction Microchannel Width | about 200 μm to about 500 μm | about 250 μm to about 450 μm | about 300 μm to about 400 μm | about 370 μm |
| Reaction Microchannel Length | about 1,000 mm to about 3,000 mm | about 1,500 mm to about 2,750 mm | about 1,750 mm to about 2,250 mm | about 1,912 mm |
| Total Microchannel Length[A] | about 1,450 mm to about 3,600 mm | about 1,975 mm to about 3,325 mm | about 2,250 mm to about 2,800 mm | about 2,444 mm |

[A]Mixing Microchannel Length + Reaction Microchannel Length.

2. Activation Process

In the activation process, raw nanoparticles ("Raw NPs" in FIG. 1) that are preferably dispersed in a solvent(s) are injected via the previously described syringe pump through first tubing 20 and into first fluid input 12 of microreactor 10 while the other syringe pump injects the coupling agent, also preferably dispersed in a solvent(s), through second tubing 22 and into second fluid input 14.

The raw nanoparticles (also referred to as "starting nanoparticles") can be any nanoparticle that requires a surface modification and/or surface group of some kind. In one embodiment, the starting nanoparticles do not already include a surface modification or group (i.e., the starting nanoparticles are "unmodified").

Suitable starting nanoparticle types include those chosen from natural or synthetic nanoclays (including those made from amorphous or structured clays), metal oxides (e.g., silica, alumina), and mixtures thereof. Particularly suitable starting nanoparticles include inorganic nanoparticles such as those chosen from silica, alumina, titania ($TiO_2$), indium tin oxide ("ITO"), CdSe, and mixtures thereof. Additionally, suitable starting nanoparticles can include metallic nanoparticles (e.g., Ti, Ag, Au) as well as carbonaceous nanoparticles such as carbon nanoparticles, graphite nanoparticles, graphene nanoparticles, carbon nanotubes, and mixtures thereof.

As used herein, nanoparticles refer to particles having an average diameter of less than about 1,000 nm. Preferably, the average diameter of the nanoparticles is less than about 500 nm, more preferably less than about 300 nm, and even more preferably about 1 nm to about 100 nm. If non-spherical nanoparticles are utilized (e.g., disc-shaped particles, platelet-shaped particles, fibers, nanotubes, etc.), the particles have at least one dimension having the foregoing size, and more preferably the largest surface-to-surface dimension of the particles fall within the foregoing ranges.

Suitable coupling agents include any compound or molecule capable of bonding with the nanoparticle surfaces, which are usually inorganic. It is also desirable for the coupling agent to include a functional group capable of serving as the attachment point for a polymerization reaction in embodiments where the activated nanoparticles will be subjected to polymer grafting, as discussed below.

In one embodiment, the coupling agent is a silane coupling agent, including mono-, di-, or tri-functional silanes, or a mixture of the foregoing.

In another embodiment, the coupling agent comprises an alkoxy group (e.g., methoxy, ethoxy, propoxy, or butoxy) and/or a reactive group such as a vinyl, epoxy, amino, acrylic, and mixtures thereof. In a further embodiment, the coupling agent is a silane comprising an alkoxy (e.g., methoxy, ethoxy, propoxy, or butoxy) and/or a reactive group such as a vinyl, epoxy, amino, acrylic, and mixtures thereof. Exemplary silane coupling agents are trialkoxysilanes, with 3-(trimethoxysilyl)propyl methacrylate ("SPM"), vinyltrimethoxysilane, and mixtures thereof being particularly preferred.

Suitable solvents include those capable of dispersing or suspending the starting nanoparticles and/or coupling agent for purposes of providing a relatively evenly dispersed fluid stream. It will be appreciated that the solvent will be selected based on the particular component(s) to be transported, but suitable solvents include methyl ethyl ketone ("MEK"), tetrahydrofuran ("THF"), toluene, hexane, dichloromethane ("DCM"), chloroform, and mixtures thereof.

The starting nanoparticle concentration during the process can range from about 0.5 M to about 10 M, preferably about 2 M to about 7 M, and more preferably about 3.5 M to about 6 M. The coupling agent concentration during the activation process can range from about 0.01 M to about 0.1 M, preferably about 0.02 M to about 0.07 M, and more preferably about 0.03 M to about 0.05 M. The solvent concentration will vary based on the molarity of the other reagents, as set forth above.

The components continuously pass or flow through the previously described mixing junction(s) before entering and passing through the mixing microchannel and subsequently the reaction microchannel. Nanoparticle activation takes place within the total length of the microchannel 16 (i.e., the mixing microchannel length plus the reaction microchannel length), although the bulk of activation will take place in the reaction microchannel. The resulting activated nanoparticles comprise the starting nanoparticles with coupling agents bonded thereto.

Preferred reaction mixture flow rates are about 24 μL/min or greater, preferably about 50 μL/min or greater, more preferably about 80 μL/min or greater, and even more preferably about 100 μL/min or greater. In some embodiments, the flow rate will be up to about 10 mL/min, preferably about 1 mL/min to about 10 mL/mind, more preferably about 2 mL/min to about 10 mL/min, and even more preferably about 4 mL/min to about 9 mL/min.

Preferred residence times ("RT") during nanoparticle activation are about 1 minute to about 3 minutes, preferably about 90 seconds to about 180 seconds, and preferably about 100 seconds to about 115 seconds. As used herein, RT= (Reactor Volume)/(Flow Rate).

The reaction fluid preferably experiences laminar flow during this time, and diffusive mixing takes place during flow, with nanoparticle activation taking place substantially continuously during this process. Preferred temperatures for activation are about 60° C. to about 100° C., more preferably about 70° C. to about 90° C., and even more preferably about 75° C. to about 85° C. Ultimately, activated nanoparticles exit microreactor fluid output 18, passing through output tubing 24. The activated nanoparticles can then be immediately subjected to a polymer grafting process (described below), or the activated nanoparticles can be directed elsewhere for other processing or even storage, depending on the desired end use. Regardless, the process can produce at least about 0.05 g activated nanoparticles/hour, preferably at least about 0.08 g activated nanoparticles/hour, more preferably at least about 0.1 g activated nanoparticles/hour, and even more preferably at least about 0.45 g activated nanoparticles/hour. In some embodiments, the process produces about 1 g to about 1.5 g activated nanoparticles/hour.

Polymer Grafting

1. Equipment

Figure 2:
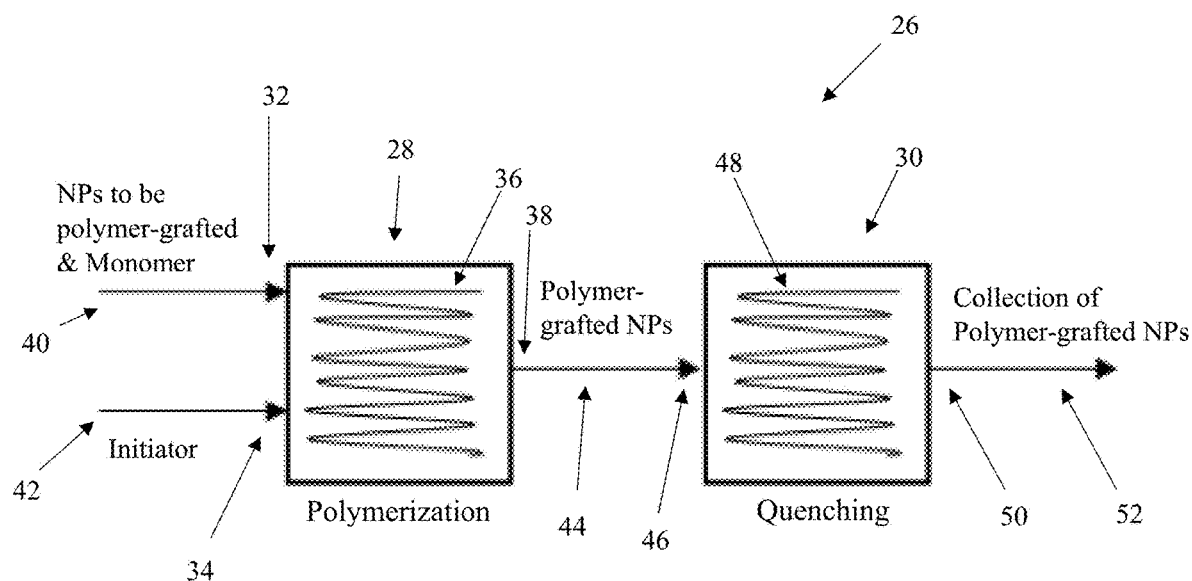
FIG. 2 is a schematic drawing (not to scale) illustrating a microreactor scheme for polymer-grafting of nanoparticle surfaces according to another embodiment.

Referring to FIG. 2, a polymerization system 26 is schematically depicted. Polymerization system 26 includes a polymerization microreactor 28 and a quenching microreactor 30. Polymerization microreactor 28 comprises a first fluid input 32, a second fluid input 34, a microchannel 36, and a fluid output 38. First tubing 40 is operably connected to first fluid input 32, while second tubing 42 is operably connected to second fluid input 34. Each of first tubing 40 and second tubing 42 is operably connected to respective injection syringes (not shown). Polymerization microreactor 28 is also equipped with one or more mixing junctions (not shown) between fluid inputs 32, 34 and microchannel 36. The mixing junction can be, for example, a T-mixing junction or a double T mixing junction, as discussed previously with respect to nanoparticle activation microreactor 10. Microchannel 36 has a micron-sized internal diameter and preferably comprises a mixing microchannel section nearer the fluid inputs 32, 34 and a reaction microchannel section after the mixing microchannel section. Fluid output 38 is operably coupled to output tubing 44.

Polymerization microreactor 28 is preferably a glass microreactor chip, with that glass being etched with the desired design/pattern, channel depths, channel widths, channel cross-sectional shape (e.g., circular, semi-circular, oblong, semi-oblong), microreactor volume, etc. Table B provides some of these values. One suitable polymerization microreactor chip 28 is sold under the name Asia by Syrris, Ltd. (UK).

TABLE B

| | | | | |
|---|---|---|---|---|
| Microreactor Volume | about 500 μl to about 2,000 μl | about 500 μl to about 1,500 μl | about 750 μl to about 1,250 μl | about 1,000 μl |
| Mixing Microchannel Depth | about 85 μm to about 1,500 μm | about 200 μm to about 1,200 μm | about 500 μm to about 1,000 μm | about 600 μm to about 800 μm |
| Mixing Microchannel Width | about 85 μm to about 1,500 μm | about 200 μm to about 1,200 μm | about 500 μm to about 1,000 μm | about 600 μm to about 800 μm |
| Mixing Microchannel Length | about 450 mm to about 600 mm | about 475 mm to about 575 mm | about 500 mm to about 550 mm | about 536 mm |
| Reaction Microchannel Depth | about 85 μm to about 1,500 μm | about 200 μm to about 1,200 μm | about 500 μm to about 1,000 μm | about 600 μm to about 800 μm |
| Reaction Microchannel Width | about 200 μm to about 1,500 μm | about 200 μm to about 1,200 μm | about 500 μm to about 1,000 μm | about 750 μm to about 950 μm |
| Reaction Microchannel Length | about 1,000 mm to about 3,000 mm | about 1,500 mm to about 2,750 mm | about 1,750 mm to about 2,250 mm | about 1,844 mm |
| Total Microchannel Length[4] | about 1,450 mm to about 3,600 mm | about 1,675 mm to about 3,125 mm | about 2,000 mm to about 2,600 mm | about 2,380 mm |

[4]Mixing Microchannel Length + Reaction Microchannel Length.

2. Polymerization Process

In the polymerization process, which is preferably a free radical polymerization process, nanoparticles to be polymer-grafted and monomers are preferably dispersed in a solvent(s) to create a reaction fluid. That reaction fluid is injected via the previously described syringe pump through first tubing 40 and into first fluid input 32 of polymerization microreactor 28. At substantially the same time, an initiator, also preferably dispersed in a solvent(s), is injected via the other syringe pump through second tubing 42 and into second fluid input 34. It is preferred that the initiator be injected separately in order to prevent premature reaction with the other components.

Any nanoparticle whose surface is amenable to polymer-grafting can be utilized in this process. The nanoparticle may have an amenable surface because of its chemical nature or because of a surface modification process (such as the one that was described above with respect to nanoparticle activation) that was carried out on those nanoparticles. Regardless, the "core" nanoparticle can be one of the types previously described with respect to the starting nanoparticle types. Additionally, the core nanoparticles will have diameters and shapes as described previously with respect to the starting nanoparticles of the activation process.

Suitable monomers include any that can be polymerized by free radical polymerization, such as vinyl-containing monomers, aldehydes, and/or ketones. Examples of preferred monomers include those chosen from methyl methacrylate, acrylic acid, methacrylic acid, styrene, vinyl acetate, vinyl chloride, butadiene, chloroprene, acrylates (e.g., butyl acrylate), and combinations thereof. It will be appreciated that the monomers will be selected based on the desired polymer chains to be formed on the nanoparticle surface. For example, if poly(methyl methacrylate) chains are desired on the nanoparticles, methyl methacrylate would be selected as the monomer.

The initiator can be any compound that is capable of producing free radicals from the above monomers. Such initiators include peroxy or azo compounds. Some preferred initiators include those chosen from azobisisobutyronitrile ("AIBN"), 4, 4'-azobis(4-cyanovaleric acid) ("ACVA"), 1,1'-azobis(cyclohexanecarbonitrile) ("ACHN"), tert-amyl peroxybenzoate, benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, tert-butyl peracetate, peracetic acid, potassium persulfate, and mixtures thereof.

Any solvent(s) suitable for a free radical polymerization reaction is suitable for use during the polymerization/grafting process. Examples of suitable solvents include MEK, THF, acetone, toluene, hexane, dichloromethane ("DCM"), chloroform, and mixtures thereof.

The concentration of the nanoparticles to be grafted (regardless of whether those nanoparticles were activated as shown in FIG. 1) can range from about 0.5 M to about 10 M, preferably about 2 M to about 7 M, and more preferably about 3.5 M to about 6 M.

The monomer concentration during the process is preferably about 1.5 mol/L of solution (i.e., solvent, nanoparticles, initiator, etc.) to about 2.8 mol/L, more preferably about 1.8 mol/L of solution to about 2.5 mol/L, and even more preferably about 2 mol/L of solution to about 2.4 mol/L.

The initiator concentration during the process can range from about 0.1 M to about 1 M, preferably about 0.3 M to about 0.9 M, and more preferably about 0.5 M to about 0.7 M.

The components continuously pass or flow through the previously described mixing junction(s) before entering and passing through the mixing microchannel and subsequently the reaction microchannel of microchannel 36. Polymerization takes place within the total length of the microchannel 36 (i.e., the mixing microchannel length plus the reaction microchannel length), although the bulk of the polymerization will take place in the reaction microchannel. As noted previously, this polymerization process is preferably a free radical polymerization process wherein the monomer units will attach to the nanoparticle surfaces, preferably through coupling agent groups bonded to the nanoparticle surfaces, and polymerize to form polymer chains bonded with those coupling agent groups.

Preferred reaction mixture flow rates are about 24 µL/min or greater, preferably about 50 µL/min or greater, more preferably about 80 µL/min or greater, and even more preferably about 100 µL/min or greater. In some embodiments, the flow rate will be up to about 10 mL/min, preferably about 1 mL/min to about 10 mL/mind, more preferably about 2 mL/min to about 10 mL/min, and even more preferably about 4 mL/min to about 9 mL/min.

Preferred residence times during polymer grafting are about 5 minutes to about 15 minutes, preferably about 7 minutes to about 12 minutes, and preferably about 10 minutes.

The reaction fluid preferably experiences laminar flow during this time, and diffusive mixing takes place during flow, with polymer grafting taking place substantially continuously during this process. Preferred temperatures for polymer grafting are about 60° C. to about 100° C., more preferably about 70° C. to about 90° C., and even more preferably about 75° C. to about 85° C. Ultimately, polymer-grafted nanoparticles exit microreactor fluid output 38, passing through output tubing 44. The polymer-grafted nanoparticles can then be subjected to a quenching process (described below) or can be directed elsewhere for other processing (including an alternative quenching process), storage, and/or immediate use (such as in an additive manufacturing composition), depending on the desired end use of the polymer-grafted nanoparticles. Regardless, the process can produce at least about 0.05 g polymer-grafted nanoparticles/hour, preferably at least about 0.08 g polymer-grafted nanoparticles/hour, more preferably at least about 0.1 g polymer-grafted nanoparticles/hour, and even more preferably at least about 0.45 g polymer-grafted nanoparticles/hour. In some embodiments, the process produces about 1 g to about 1.5 g polymer-grafted nanoparticles/hour.

The weight average molecular weight of the polymers grafted to the nanoparticles is about 10,000 Daltons to about 100,000 Daltons, preferably about 10,000 Daltons to about 80,000 Daltons, more preferably about 20,000 Daltons to about 70,000, and even more preferably about 30,000 Daltons to about 65,000 Daltons. Weight average molecular weight is determined by Gel Permeation Chromatography ("GPC"). Additionally, the polydispersity ("PDI," also determined by GPC) of the polymer grafts is less than about 2, preferably less than about 1.8, more preferably less than about 1.5, and even more preferably less than about 1.2 or even less than about 1.1.

The formed polymer-grafted nanoparticles have an average grafting density of about 8.488E-05 polymer chains/$nm^2$ of nanoparticle surface area to about 9.62E-03 polymer chains/$nm^2$ of nanoparticle surface area. As used herein, grafting density is determined using the analytical ultracentrifugation method (AUC) as described by Benoit D N, Zhu H, Lilierose M H, Verm R A, Ali N, Morrison A N, Fortner J D, Avendano C, Colvin V L. Measuring the grafting density of nanoparticles in solution by analytical ultracentrifugation and total organic carbon analysis. Anal Chem. 2012 Nov. 6; 84(21):9238-45. doi: 10.1021/ac301980a. Epub 2012 Oct. 9. PMID: 22967239; PMCID: PMC4538977, incorporated by reference herein.

Quenching

1. Equipment

In embodiments where the polymer-grafted nanoparticles are immediately and continuously subjected to a quenching step, quenching microreactor 30 (right half of FIG. 2) can be utilized. Quenching microreactor 30 comprises a fluid input 46, a microchannel 48, and a fluid output 50. Output tubing 44 of polymerization microreactor 28 is operably connected to fluid input 46 of quenching microreactor 30. Quenching microreactor 30 can optionally be equipped with one or more mixing junctions (not shown but as previously discussed) between fluid input 46 and microchannel 48. Microchannel 38 has a micron-sized internal diameter and can optionally comprise a mixing microchannel section nearer the fluid input 46 and a reaction microchannel section after the mixing microchannel section. Fluid output 50 is operably coupled to output tubing 52.

Quenching microreactor 30 is preferably a glass microreactor chip, with that glass being etched with the desired design/pattern, channel depths, channel widths, channel cross-sectional shape (e.g., circular, semi-circular, oblong, semi-oblong), microreactor volume, etc. Table C provides some of these values. One suitable quenching microreactor chip 30 is sold under the name Asia by Syrris, Ltd. (UK).

Preferred residence times through microchannel 48 are about 1 minute to about 4 minutes, preferably about 90 seconds to about 3 minutes, and preferably about 2.5 minutes. These rates allow production of at least about 0.05 g polymer-grafted nanoparticles/hour, preferably at least about 0.08 g polymer-grafted nanoparticles/hour, more preferably at least about 0.1 g polymer-grafted nanoparticles/hour, and even more preferably at least about 0.45 g polymer-grafted nanoparticles/hour. In some embodiments, the process produces about 1 g to about 1.5 g polymer-grafted nanoparticles/hour.

The weight average molecular weight, PDI, and other properties of the polymer chains will be as described previously when describing the polymerization process.

Telescoped Process

Figure 3:
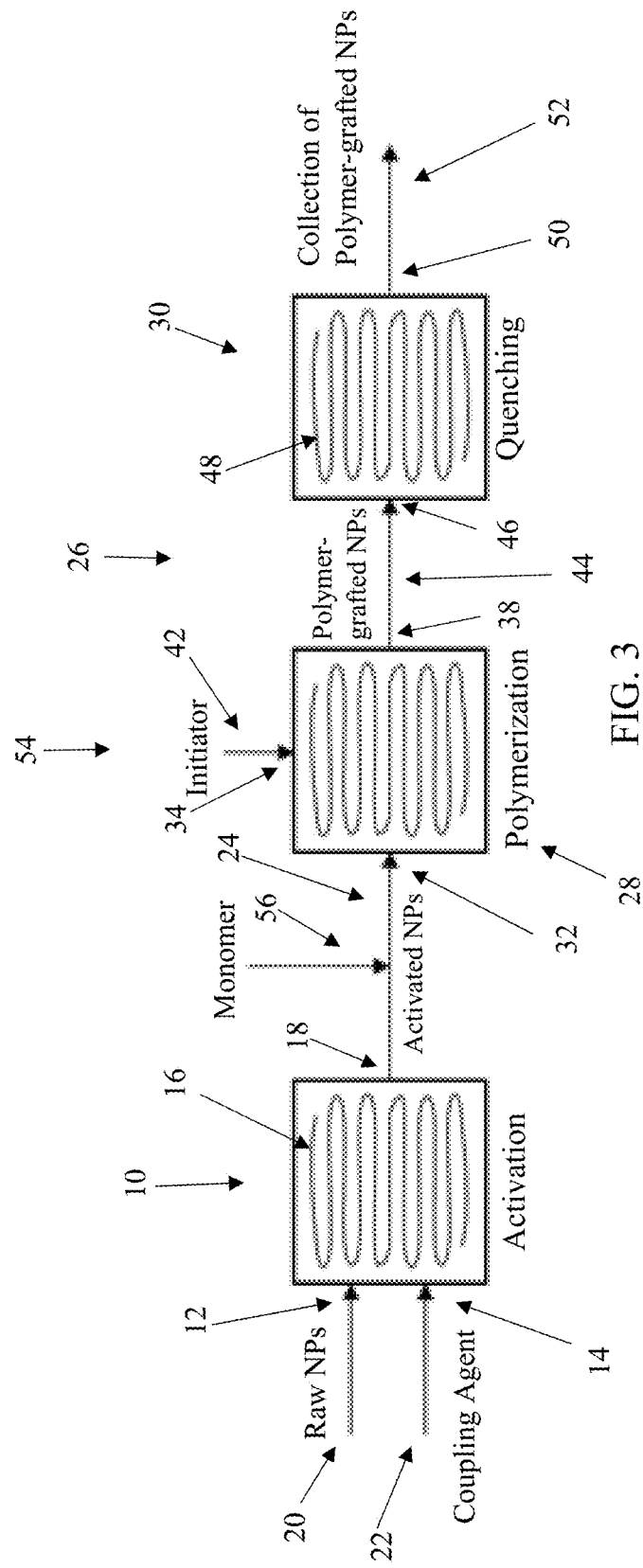
FIG. 3 is a schematic drawing (not to scale) illustrating a telescoped process that combines the embodiments of FIGS. 1 and 2 into a continuous, serial process.

A further embodiment involves a telescoped process. That is, nanoparticle activation, polymer grafting, and quenching are carried out in series in three glass, linked chip reactors. Referring to FIG. 3, where like numbers designate like parts, a telescoped system 54 is schematically illustrated. This system 54 combines the nanoparticle activation microreactor 10 of FIG. 1 with the polymerization system 26 of FIG. 2. The difference in the equipment configuration from that

TABLE C

| | | | | |
|---|---|---|---|---|
| Microreactor Volume | about 50 µl to about 1,000 µl | about 75 µl to about 750 µl | about 100 µl to about 500 µl | about 250 µl |
| Mixing Microchannel Depth | about 85 µm to about 1,000 µm | about 100 µm to about 800 µm | about 175 µm to about 500 µm | about 250 µm |
| Mixing Microchannel Width | about 85 µm to about 1,000 µm | about 100 µm to about 900 µm | about 200 µm to about 600 µm | about 300 µm |
| Mixing Microchannel Length | about 450 mm to about 600 mm | about 475 mm to about 575 mm | about 500 mm to about 550 mm | about 532 mm |
| Reaction Microchannel Depth | about 85 µm to about 1,000 µm | about 100 µm to about 800 µm | about 175 µm to about 500 µm | about 250 µm |
| Reaction Microchannel Width | about 200 µm to about 1,200 µm | about 275 µm to about 1,000 µm | about 350 µm to about 700 µm | about 400 µm |
| Reaction Microchannel Length | about 1,300 mm to about 3,500 mm | about 1,500 mm to about 3,000 mm | about 1,800 mm to about 2,750 mm | about 2,509 mm |
| Total Microchannel Length[A] | about 1,750 mm to about 4,100 mm | about 1,975 mm to about 3,575 mm | about 2,300 mm to about 3,300 mm | about 3,041 mm |

[A]Mixing Microchannel Length + Reaction Microchannel Length.

2. Quenching Process

Quenching is preferably carried out by rapidly cooling the reaction fluid. This preferably involves exposing the reaction fluid to a temperature that is at least about 50° C. lower than the average temperature at which polymerization was carried out, preferably at least about 65° C. lower, and even more preferably at least about 85° C. lower. This typically results in quenching temperatures of about −25° C. to about 15° C., more preferably about −15° C. to about 5° C., and even more preferably about −8° C. to about −3° C.

Preferred flow rates through the quenching microreactor 30 are about 24 µL/min or greater, preferably about 50 µL/min or greater, more preferably about 80 µL/min or greater, even more preferably about 100 µL/min or greater. In some embodiments, the flow rate will be up to about 10 mL/min, preferably about 1 mL/min to about 10 mL/mind, more preferably about 2 mL/min to about 10 mL/min, and even more preferably about 4 mL/min to about 9 mL/min.

previously is that polymerization microreactor 28 does not include first tubing 40 at first fluid inlet 32. Rather, output tubing 24 of nanoparticle activation reactor 10 is connected directly to first fluid input 32 of polymerization reactor 28. Thus, activated nanoparticles flow continually and immediately from fluid output 18 through output tubing 24 and into first fluid input 32. The monomer is introduced into output tubing 24, such as via monomer inlet 56 so that the activated nanoparticles and monomer enter polymerization microreactor 28 at substantially the same time for ultimately mixing and reacting with the initiator that is still introduced via second fluid input 34 of polymerization microreactor 30, similar to the FIG. 2 embodiment. The reaction components, parameters (flow rate, molarities, temperatures, residence times, etc.), and equipment are otherwise similar to those set forth above with respect to the discussion of FIGS. 1 and 2.

It will be appreciated that this telescoped combination provides a substantially continuous process of forming polymer-grafted nanoparticles that is superior to the batch processes of the prior art. That is, once the activated nanoparticles are formed, they are introduced into the polymerization microreactor 28 within about 10 seconds or less, preferably within about 5 seconds or less, more preferably within about 2 seconds or less, and more preferably within about 1 second or less. Additionally, once the polymer-grafted nanoparticles have been formed, they are introduced into the quenching reactor 30 within about 10 seconds or less, preferably within about 5 seconds or less, more preferably within about 2 seconds or less, and more preferably within about 1 second or less.

Although the foregoing describes certain preferred microreactor chip sizes and properties for each of the activation, polymerization, and quenching steps, it will be appreciated that these can be scaled up for one, two, or all three of these steps. Additionally, each of the activation, polymerization, and quenching steps could utilize any of the microreactor chips having the dimensions set forth in any of Tables A, B, and/or C, including "mixing-and-matching" of those dimensions.

It will also be appreciated that the disclosed process could be even further scaled up by using multiple activation microreactors, polymerization reactors, and/or quenching reactors linked for a continuous (i.e., non-batch) process. Additionally or alternatively, the process could also be scaled up by using larger reactors.

Finally, while the foregoing process describes a quenching step, it will be appreciated that quenching is optional and/or could be performed in a different manner (e.g., other than in a microreactor, using a quenching agent).

Additional advantages of the various embodiments will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLE

The following example sets forth a method in accordance with the disclosure. It is to be understood, however, that this example is provided by way of illustration, and nothing therein should be taken as a limitation upon the overall scope.

Figure 4:
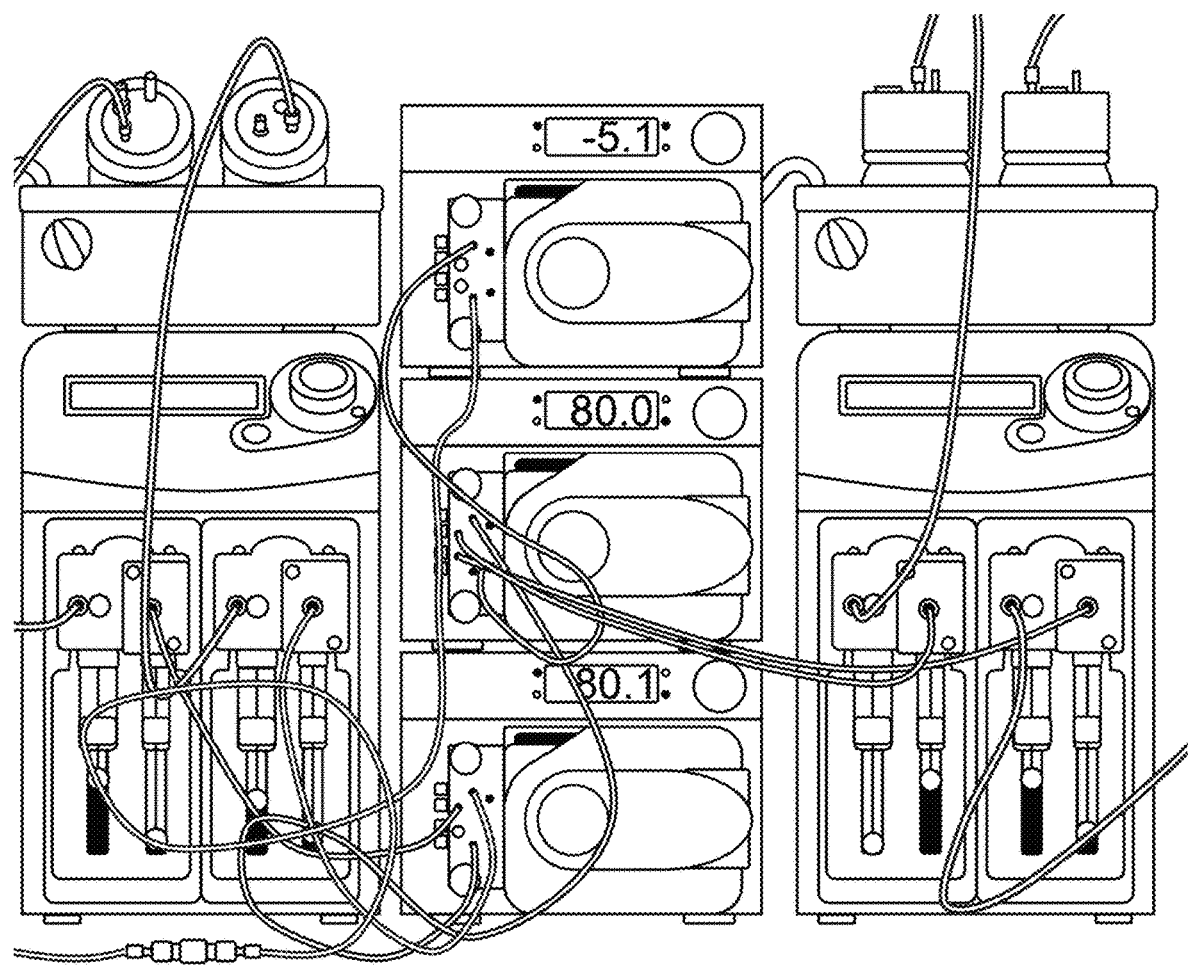
FIG. 4 is a line drawing illustrating of the equipment used to create polymer-grafted nanoparticles as described in the Example.

A microreactor system (sold under the name Asia by Syrris Ltd., UK) equipped with microreactor chips was utilized to graft raw $SiO_2$ nanoparticles with poly(methyl methacrylate) chains. The equipment setup is shown in FIG. 4, where the equipment included two Asia Pressurized Input Stores (top left and to right), two Asia Syringe Pumps (bottom left and bottom right), and three Asia Chip Climate Controllers (three stacked in center).

The activation and polymerization processes were run at 80° C. at a flow rate of 2 mL/min (1 mL/min each side) through a 62.5-µL and 1-mL microfluidic chip (Syrris, Ltd.), respectively. The concentrations for the reaction in this series were:

SMP: 0.46 M
NP: 4.16 M
MMA: 2.25 M
AIBN: 0.6 M

The raw nanoparticle surfaces were activated with SPM. Polymerization was carried out using methyl methacrylate monomers and AIBN (in acetone) as the initiator. The reaction solvent was THF. After polymerization was complete, the reaction was cooled to −5° C. in a 250-µL microfluidic chip (Syrris, Ltd.). The rate of production of the grafted nanoparticles was 0.123 g grafted nanoparticles/hour.

Figure 5:
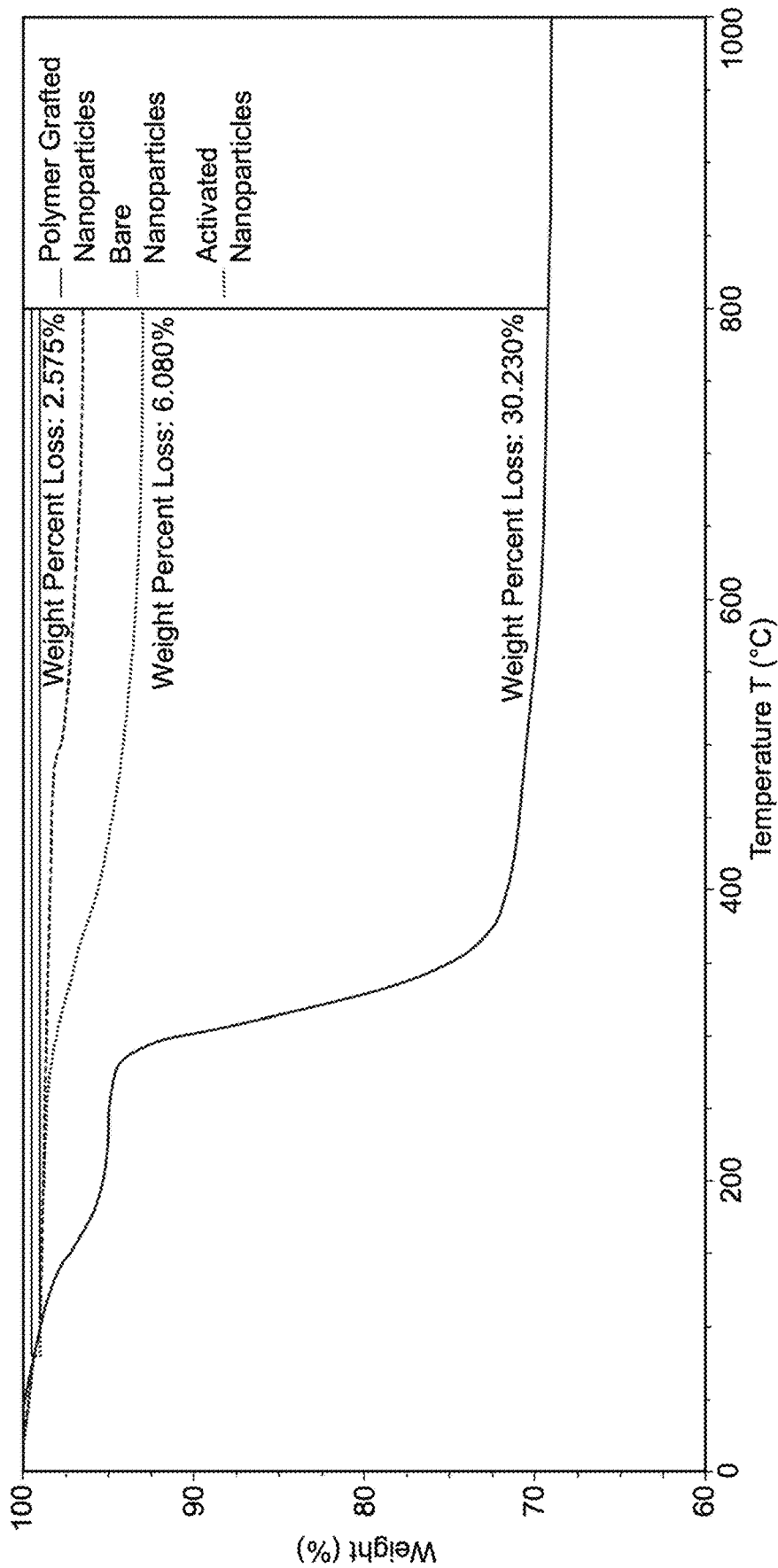
FIG. 5 is a graph showing thermogravimetric analysis results comparing bare nanoparticles, activated nanoparticles, and polymer-grafted nanoparticles as described in the Example.
Figure 6:
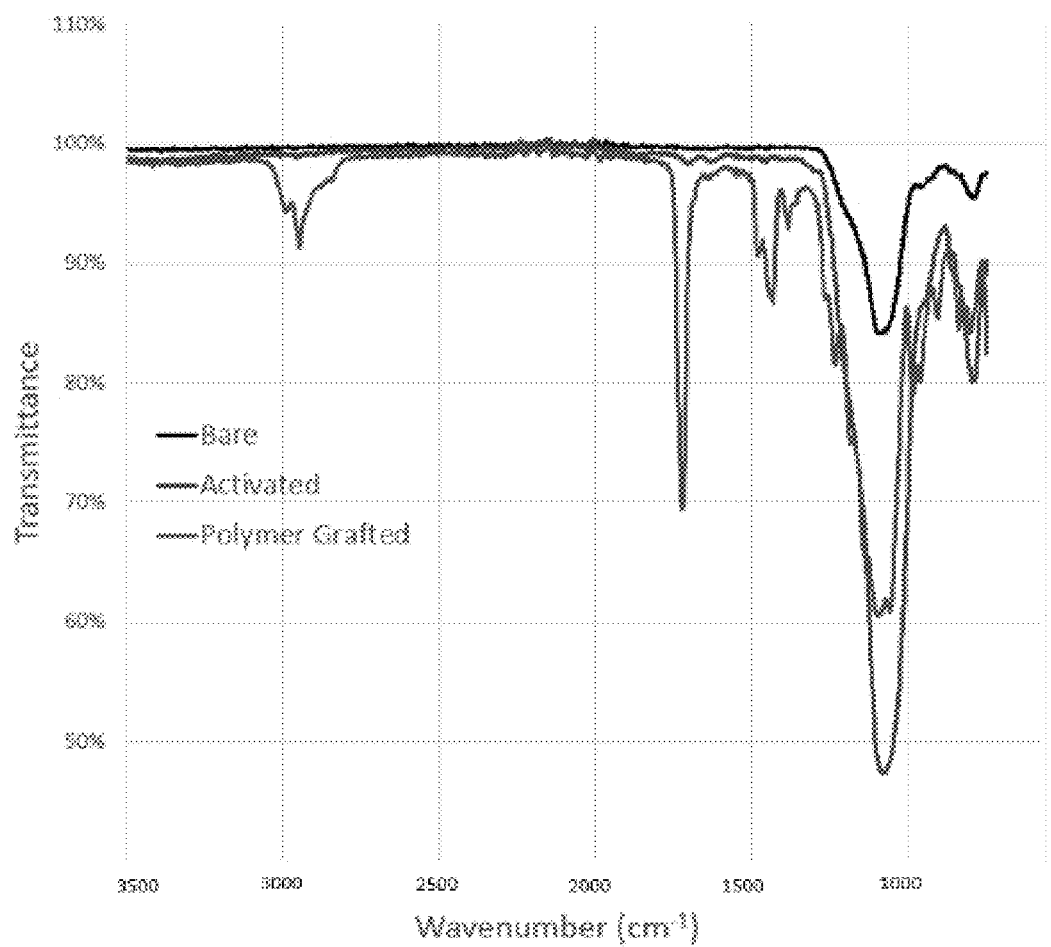
FIG. 6 provides a graph comparing the FTIR spectra of bare nanoparticles, activated nanoparticles, and polymer-grafted nanoparticles as described in the Example.

Presence of the grafted polymer on the nanoparticles was verified using total weight loss from thermogravimetric analysis ("TGA") as well as FTIR. Bare nanoparticles have a band at 1110 $cm^{-1}$ (Si—O—Si bonds) that grows stronger in the activated nanoparticles (Si—O—R bonds from the SPM). Polymer grafted nanoparticles display a band at 1725 $cm^{-1}$ (C═O from PMMA). FIG. 5 shows the TGA of bare, activated, and polymer-grafted nanoparticles prepared as described herein, while FIG. 6 depicts the FTIR spectra of the bare, activated, and polymer-grafted nanoparticles.

Advantageously, these PMMA-grafted silica nanoparticles can be used as a filler or additive in additive-manufactured processes so as to yield parts having improved properties.

We claim:

1. A continuous flow process for producing activated nanoparticles, the process comprising:
    passing a quantity of starting nanoparticles and a coupling agent through a first microchannel having a first microchannel length, wherein said coupling agent bonds with said starting nanoparticles to form the activated nanoparticles within the first microchannel length; and
    passing said activated nanoparticles and a quantity of monomer through a second microchannel having a second microchannel length, wherein said monomer polymerizes within the second microchannel length to form polymer-grafted nanoparticles, said polymer-grafted nanoparticles comprising polymeric chains bonded to said coupling agent.

2. The process of claim 1, further comprising passing an initiator through said second microchannel with said activated nanoparticles and said quantity of monomer.

3. The process of claim 1, wherein the passing of said activated nanoparticles and quantity of monomer through said second microchannel length is commenced within about 10 seconds or less after said activated nanoparticles are formed.

4. The process of claim 1, further comprising passing said polymer-grafted nanoparticles through a third microchannel having a third microchannel length, wherein said third microchannel quenches said polymerizing.

5. The process of claim 4, wherein the passing of said polymer-grafted nanoparticles through said third microchannel length is commenced within about 10 seconds or less after said polymer-grafted nanoparticles are formed.

6. The process of claim 4, wherein:
the passing of said activated nanoparticles and quantity of monomer through said second microchannel length is commenced within about 10 seconds or less after said activated nanoparticles are formed; and
the passing of said polymer-grafted nanoparticles through said third microchannel length is commenced within about 10 seconds or less after said polymer-grafted nanoparticles are formed.

7. The process of claim 1, wherein the passing of said starting nanoparticles and coupling agent through said first microchannel length is completed in about 1 minute to about 3 minutes.

8. The process of claim 1, wherein the passing of said activated nanoparticles and quantity of monomer through said second microchannel length is completed in about 5 minutes to about 15 minutes.

9. The process of claim 4, wherein the passing of said polymer-grafted nanoparticles through said third microchannel length is completed in about 1 minute to about 4 minutes.

10. The process of claim 1, wherein said polymer-grafted nanoparticles are formed at a rate of about 0.05 g polymer-grafted nanoparticles/hour or greater.

11. The process of claim 1, wherein said polymer-grafted nanoparticles have an average grafting density of about 8.488E-05 polymer chains/nm$^2$ of nanoparticle surface area to about 9.62E-03 polymer chains/nm$^2$ of nanoparticle surface area.

12. The process of claim 1, wherein said starting nanoparticles are chosen from clay nanoparticles, metal oxide nanoparticles, metal nanoparticles, carbonaceous nanoparticles, or mixtures thereof.

13. The process of claim 12, wherein said starting nanoparticles are chosen from silica nanoparticles, alumina nanoparticles, titania nanoparticles, indium tin oxide nanoparticles, CdSe nanoparticles, Ti nanoparticles, Ag nanoparticles, Au nanoparticles, carbon nanoparticles, graphite nanoparticles, graphene nanoparticles, carbon nanotubes, or mixtures thereof.

14. The process of claim 1, wherein said coupling agent comprises an alkoxy and a reactive group, said reactive group being chosen from vinyls, epoxies, aminos, acrylics, or mixtures thereof.

15. The process of claim 14, wherein said coupling agent is chosen from 3-(trimethoxysilyl)propyl methacrylate, vinyltrimethoxysilane, or mixtures thereof.

16. The process of claim 1, said monomer comprising at least one group chosen from vinyls, aldehydes, ketones, or mixtures thereof.

17. The process of claim 16, said monomer being chosen from methyl methacrylate, acrylic acid, methacrylic acid, styrene, vinyl acetate, vinyl chloride, butadiene, chloroprene, acrylates, or combinations thereof.

18. A continuous flow process for modifying nanoparticles, the process comprising:

passing a quantity of starting nanoparticles and a coupling agent through a first microchannel having a first microchannel length, wherein said coupling agent:

bonds with said starting nanoparticles to form activated nanoparticles within the first microchannel length; and comprises an alkoxy and a reactive group chosen from vinyls, epoxies, aminos, acrylics, or mixtures thereof; and within about 10 seconds after said activated nanoparticles are formed, passing said activated nanoparticles, a quantity of monomer, and an initiator through a second microchannel having a second microchannel length, wherein said monomer polymerizes within the second microchannel length to form polymer-grafted nanoparticles comprising polymeric chains bonded to said coupling agent, said polymer-grafted nanoparticles being formed at a rate of about 0.05 g polymer-grafted nanoparticles/hour or greater.

19. The process of claim 18, wherein:

said starting nanoparticles are chosen from silica nanoparticles, alumina nanoparticles, titania nanoparticles, indium tin oxide nanoparticles, CdSe nanoparticles, Ti nanoparticles, Ag nanoparticles, Au nanoparticles, carbon nanoparticles, graphite nanoparticles, graphene nanoparticles, carbon nanotubes, or mixtures thereof;

said monomer is chosen from methyl methacrylate, acrylic acid, methacrylic acid, styrene, vinyl acetate, vinyl chloride, butadiene, chloroprene, acrylates, or combinations thereof; and said initiator is chosen from azobisisobutyronitrile, 4,4'-azobis(4-cyanovaleric acid), 1,1'-azobis(cyclohexanecarbonitrile), tert-amyl peroxybenzoate, benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclo-hexane, tert-butyl hydroperoxide, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, tert-butyl peracetate, peracetic acid, potassium persulfate, or mixtures thereof.

* * * * *